United States Patent [19]

Demuth et al.

[11] Patent Number: 4,848,686
[45] Date of Patent: Jul. 18, 1989

[54] BOBBIN TUBE AND PACKAGE SUPPORT AND BEARING UNIT THEREFOR AND FILAMENT TAPE-UP SYSTEM

[75] Inventors: Robert Demuth, Nürensdorf; Walter Hefti, Ettenhausen; Urs Keller, Seuzach; Daniel Hanselmann, Winterthur, all of Switzerland

[73] Assignee: Rieter Machine Works Ltd., Winterthur, Switzerland

[21] Appl. No.: 943,120

[22] Filed: Dec. 18, 1986

[30] Foreign Application Priority Data

Dec. 24, 1985 [GB] United Kingdom ................. 8531722

[51] Int. Cl.⁴ .......................................... B65H 54/42
[52] U.S. Cl. ........................... 242/18 DD; 242/129.51; 384/536
[58] Field of Search .......... 242/18 DD, 18 R, 129.51, 242/65, 66, 68.4; 384/535, 536, 581, 582

[56] References Cited

U.S. PATENT DOCUMENTS

| | | | |
|---|---|---|---|
| 2,651,479 | 9/1953 | Bauer | 242/129.51 |
| 2,865,577 | 12/1958 | Furst | 242/129.51 |
| 3,286,948 | 11/1966 | Franzen et al. | 242/129.51 |
| 3,917,182 | 11/1975 | Lenk | 242/18 DD X |

FOREIGN PATENT DOCUMENTS

| | | | |
|---|---|---|---|
| 1414573 | 9/1965 | France . | |
| 339102 | 7/1959 | Switzerland . | |
| 756717 | 9/1956 | United Kingdom | 242/129.51 |

Primary Examiner—Stanley N. Gilreath
Attorney, Agent, or Firm—Werner W. Kleeman

[57] ABSTRACT

A tube-supporting cradle mechanism for a filament, especially a yarn or thread take-up system is provided with a resiliently deformable body enabling relative adjustment of relatively rigid parts which adjoin the resiliently deformable body in order to permit line contact between a bobbin tube or its package wound thereupon, which is supported by the cradle, and a friction drive roll.

35 Claims, 8 Drawing Sheets

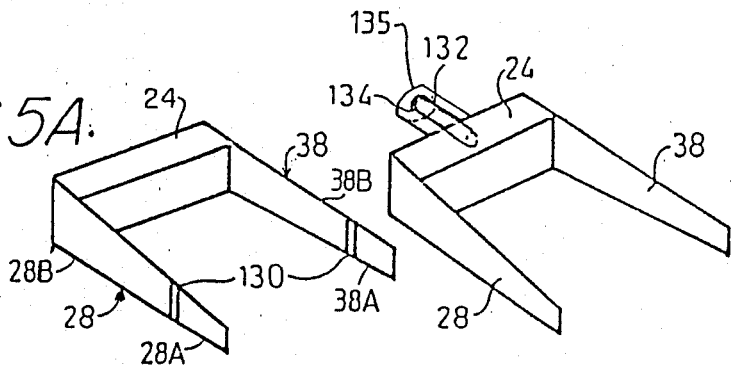
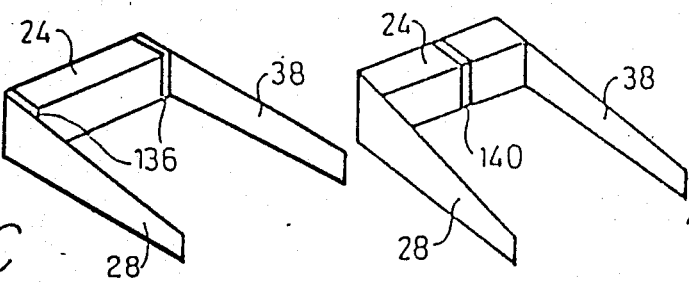
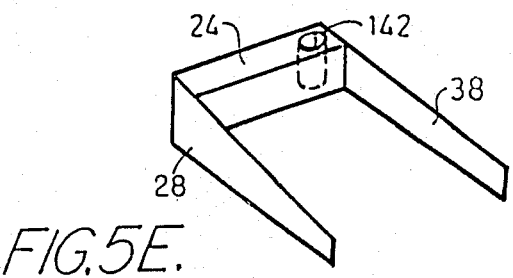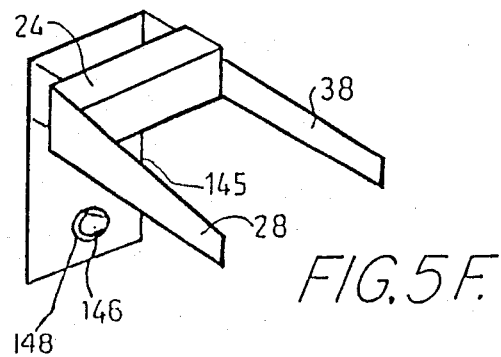

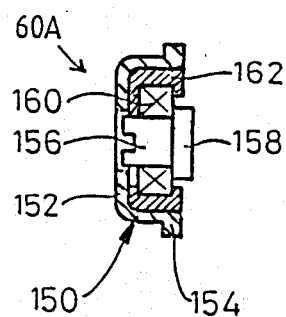 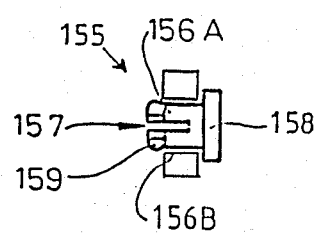 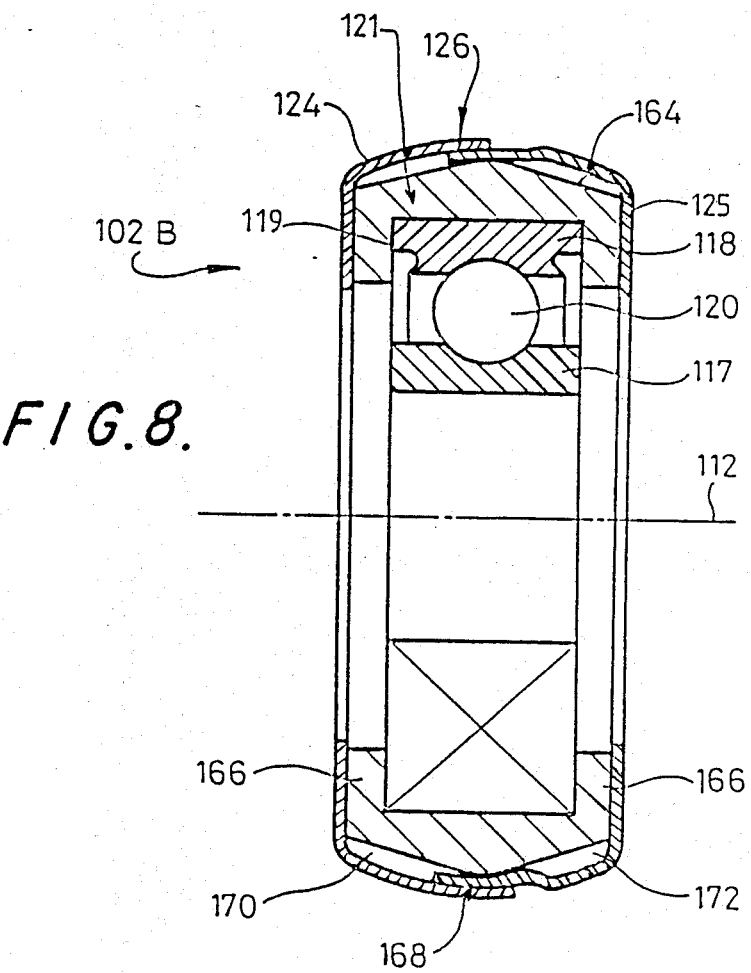

BOBBIN TUBE AND PACKAGE SUPPORT AND BEARING UNIT THEREFOR AND FILAMENT TAPE-UP SYSTEM

CROSS-REFERENCE TO RELATED APPLICATION

This application is related to the commonly assigned, copending U.S. application Ser. No. 06/843,172, filed Mar. 24, 1986, and entitled "ARRANGEMENT FOR HOLDING YARN PACKAGES" U.S. Pat. No. 4,718,615, granted Jan. 12, 1988. The disclosure of this application is incorporated herein by reference.

BACKGROUND OF THE INVENTION

The present invention relates to a new and improved construction of a take-up system for winding a filament, especially a yarn or thread into a package on a bobbin tube.

The present invention also relates to a new and improved construction of a bobbin tube support mechanism for a take-up system for winding a filament, especially a yarn or thread into a package on a bobbin tube, and in which take-up system the bobbin tube or package forming thereupon engages a rotatable roll.

Furthermore, the present invention relates to a new and improved construction of a bearing unit.

In its more particular aspects, the present invention specifically relates to a new and improved construction of a filament take-up system for winding a filament, especially a yarn or thread into a package on a bobbin tube and which filament take-up system contains a bobbin tube support mechanism supporting the bobbin tube and the package wound thereupon and urging the bobbin tube or the package wound thereupon into engagement with a rotatable or drive roll.

The roller may be of the grooved drum type adapted to traverse the thread to and fro. Instead, a separate traverse mechanism may be provided in order to enable formation of a cross-wound package. In a preferred arrangement, the mechanism is of the so-called cradle type and has a pair of arms between which the bobbin tube is supported during use. In an alternative arrangement the bobbin tube is supported on a cantilevered stub shaft or spindle.

In filament take-up systems of such type, it is known to support bobbin tube engaging elements in a manner enabling limited movement thereof relative to other parts of the mechanism. There is thus provided a limited degree of adjustment to compensate for misalignments when the bobbin tube is brought into contact with the rotatable or drive roll. One such system is shown, for example, in German patent specification No. 1,560,475 and the cognate U.S. Pat. No. 3,286,948, granted Nov. 22, 1966. An alternative system is shown in Swiss Patent No. 339,102, published July 31, 1959.

It has been found, however, that these known systems still do not enable compensation for misalignments so as to produce line contact between the bobbin tube and the rotatable or drive roll. Furthermore, they do not provide damping against the effects of shocks which inevitably arise during formation of cross-wound packages.

SUMMARY OF THE INVENTION

Therefore, with the foregoing in mind it is a primary object of the present invention to provide a new and improved construction of a filament take-up system for winding a filament, especially a yarn or thread into a package on a bobbin tube and which filament take-up system does not exhibit the aforementioned drawbacks and limitations of the prior art constructions heretofore discussed.

Another and more specific object of the present invention is directed to a new and improved construction of a filament take-up system for winding a filament, especially a yarn or thread into a package on a bobbin tube and which filament take-up system permits compensation for misalignments between the bobbin tube or the package forming thereupon and the rotatable or drive roll so as to produce line contact between these elements substantially under all operating conditions of such filament take-up system.

Still a further important object of the present invention aims at a new and improved construction of a filament take-up system for winding a filament, especially a yarn or thread into a package on a bobbin tube and which filament take-up system provides sufficient damping against shock effects arising during the formation particularly of cross-wound packages.

Now in order to implement these and still further objects of the invention, which will become more readily apparent as the description proceeds, the filament take-up system of the present development is manifested by the features that, a body of resiliently deformable material is used to enable the required degree of line contact between the bobbin tube or the package forming thereupon and the rotatable or drive roll.

The resiliently deformable material may be resiliently compressible and constitute, for example, a porous elastomeric material such as a polyurethane elastomer. The important feature here is, however, volume compressibility of the body of resiliently deformable material and this characteristic may be achieved by means other than the inclusion of pores in the material of the body. For example, a body of compact elastomeric material may be formed so as to define or provide one or more spaces. The compact elastomeric material, then, can be deformed into the space or spaces in order to thereby enable volume compression of the body and provide the required resilient compressibility.

The body of resiliently deformable material will be mounted in use between relatively rigid parts which adjoin the body of resiliently deformable material. The relatively rigid parts may be secured relative to each other by the body of resiliently deformable material.

Preferably, the rigid parts are not required to rotate relative to each other during use, i.e. the body of resiliently deformable material is not required to transmit torque between the relatively rigid parts adjoining such body.

The body of resiliently deformable material may be arranged for preferential deformation to permit relative movement of the relatively rigid parts in at least one "preferred" direction at right angles to the axis of rotation of the tube or package forming thereupon. The preferred direction preferably is also substantially at right angles to a support arm carrying the tube or package forming thereupon during a winding operation. The body may also be arranged to prevent, or at least restrict, relative movement of the relatively rigid parts in one or more other directions, for example, along the axis of rotation of the tube or the package forming thereupon, at least as far as such movement is dependent upon deformation of such body.

Preferential deformability of the body of resiliently deformable material may be realized by suitable formation of such body and assembly thereof with the relatively rigid parts such as to form a unit. The arrangement may be such that at least one predetermined space is left in the assembly prior to deformation of the body during use such that, when forces are applied to the assembly and tend to cause relative movement of the relatively rigid parts in the preferred direction, the body is able to deform into said at least one predetermined space. The arrangement may be such that little or no space is left for deformation of the body to permit relative movement of the relatively rigid parts in the aforementioned one or more other directions.

In a preferred arrangement, the body of resilient material is incorporated into a bearing unit which can be mounted in the bobbin tube supporting mechanism of the filament, especially yarn or thread take-up system so as to support a tube-engaging element for rotation about a defined axis relative to another portion of the mechanism, for example, one of the arms in a cradle mechanism. The bearing unit may constitute a conventional bearing comprising a pair of relatively rotatable bearing elements. This conventional bearing may be mounted at a mounting member, for example, in the form of a shell or housing, and retained relative thereto by means of the body of resilient material. The body of resilient material, then, conveniently is ring-shaped. Preferential deformation can be facilitated by suitable choice of ring section.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIGS. 5A to 5F show six sketches representing alternative arrangements for the body of resilient material used in the bobbin tube support mechanisms shown in FIGS. 1 and 2;

FIG. 6 is a cross-sectional view similar to FIG. 3 of a bobbin tube support for supporting the smaller diameter end of a conical bobbin tube;

FIG. 7 shows a modification of the bobbin tube support shown in FIG. 6;

FIG. 8 shows a second exemplary embodiment of the inventive bearing unit containing an alternative form of a resilient ring, for installation in a second exemplary embodiment of the inventive bobbin tube support mechanism;

DETAILED DESCRIPTION OF THE PREFERRED EMBODIMENTS

Figure 1:
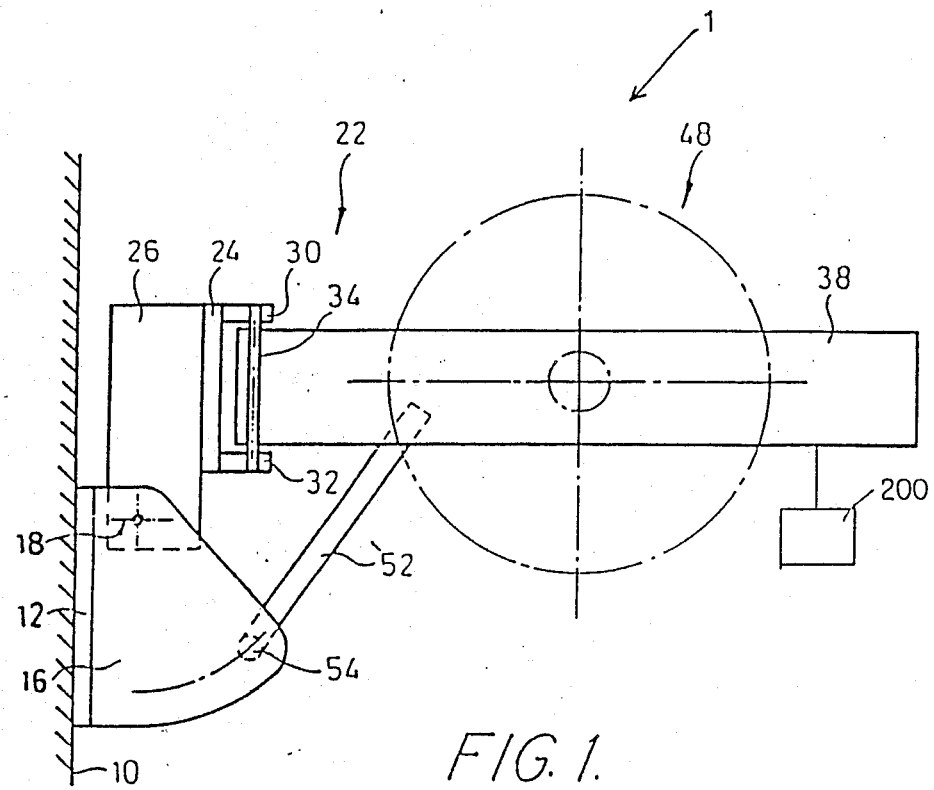
FIGS. 1 and 2 respectively show a side view and a top plan view of a first exemplary embodiment of the inventive bobbin tube support mechanism in a first exemplary embodiment of the inventive filament take-up system.

Describing now the drawings, it is to be understood that only enough of the construction of the yarn or filament take-up system, the bobbin tube support mechanism and the bearing unit have been shown as needed for those skilled in art to readily understand the underlying principles and concepts of the present development, while simplifying the showing of the drawings. Turning attention now specifically to FIG. 1 of the drawings, some of the more pertinent structure of the filament yarn of take-up system illustrated therein by way of example and not limitation will be seen to comprise a filament, especially a yarn or thread package holder of the type described in detail in European Patent Application No. 86105117.5 which is cognate to the initially cross-referenced U.S. patent application Ser. No. 06/843,172. The details thus will not be repeated here, but the arrangement will be described briefly generally using reference numerals corresponding with those used in the aforementioned copending U.S. application, now U.S. Pat. No. 4,718,615.

Reference numeral 10 indicates part of the machine frame, the remainder of which is omitted since it is not important to the understanding of the invention. Numerals 14 and 16 indicate side plates projecting forwardly from a bracket 12 which is secured in any suitable manner to the frame 10. Pins 18 are supported in these side plates 14 and 16 in order to form a pivot joint for a so-called cradle or bobbin tube support mechanism indicated generally at 22. This cradle or bobbin tube support mechanism 22 comprises a support means or yoke 24 having rearwardly extending side plates 26 which are mounted at the pins 18 in order to form the pivot joint referred to above. A first arm or support arm 28 is formed integrally with the yoke 24 and a second arm or support arm 38 is pivotally mounted by means of a pin 34 in lugs 30 and 32 also integral with the yoke 24.

The second support arm 38 can be pivoted about the pin 34 from the illustrated position approximately parallel to the first support arm 28 to a position 40 which is indicated by broken lines and which is spaced further away from the first support arm 28 in order to enable insertion or removal of a bobbin tube 44. When the cradle or bobbin tube support mechanism 22 is "closed", i.e. the second support arm 38 is in the position indicated by solid lines, the bobbin tube 44 is supported between the two support arms 28 and 38 and rotatable relative thereto by means of bearings schematically indicated at 46. During a winding operation, a filament, especially a yarn or thread package indicated at 48 is wound upon the bobbin tube 44.

A friction damping system comprising a leaf spring 52, a contact element 54 and a segment-shaped forward extension on the side plate 16, as described in the aforementioned commonly assigned, copending U.S. patent application Ser. No. 06/843,172, now U.S. Pat. No. 4,718,615 can be included in the inventive take-up system but is not essential thereto. The present invention is more particularly concerned with supporting the bobbin tube 44 in a desired disposition relative to other parts of the take-up system, as will be described further hereinbelow with reference to the remaining Figures of the drawings.

Figure 2:
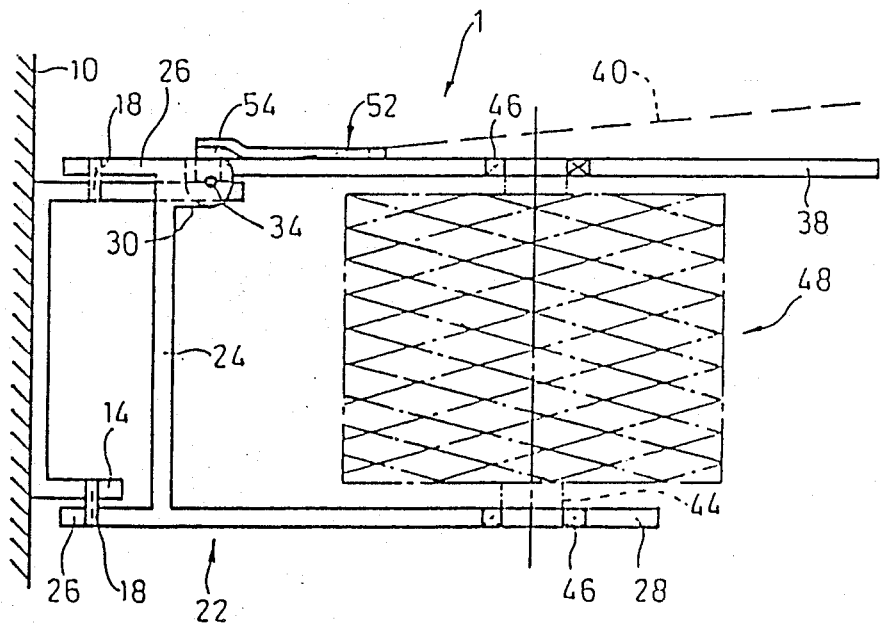

In the inventive filament take-up system 1 to the extent shown in FIGS. 1 and 2, each bearing 46 is mounted directly in its associated support arm and the bobbin tube 44 is supported within the bearing 46. In practice, the bobbin tube 44 and the package carried 48 thereby is rotated by frictional contact with a rotatable or friction drive roll which is not illustrated in FIGS. 1 and 2 but may be of the type of the frictional drive roll 116 shown in FIG. 3. The drive roll 116 is rotatable about a predetermined roll axis 113 and a bobbin tube rotation axis 112 (see FIG. 3) extends substantially parallel thereto. Clearly, in such arrangement the axial length of the rotatable or friction drive roll 116 must be less than the spacing of the support arms 28 and 38 when those support arms are closed. In effect, the cradle or bobbin tube support mechanism 22 must have an individual drive roll or drive roll portion which fits between its support arms 28 and 38.

Figure 3:
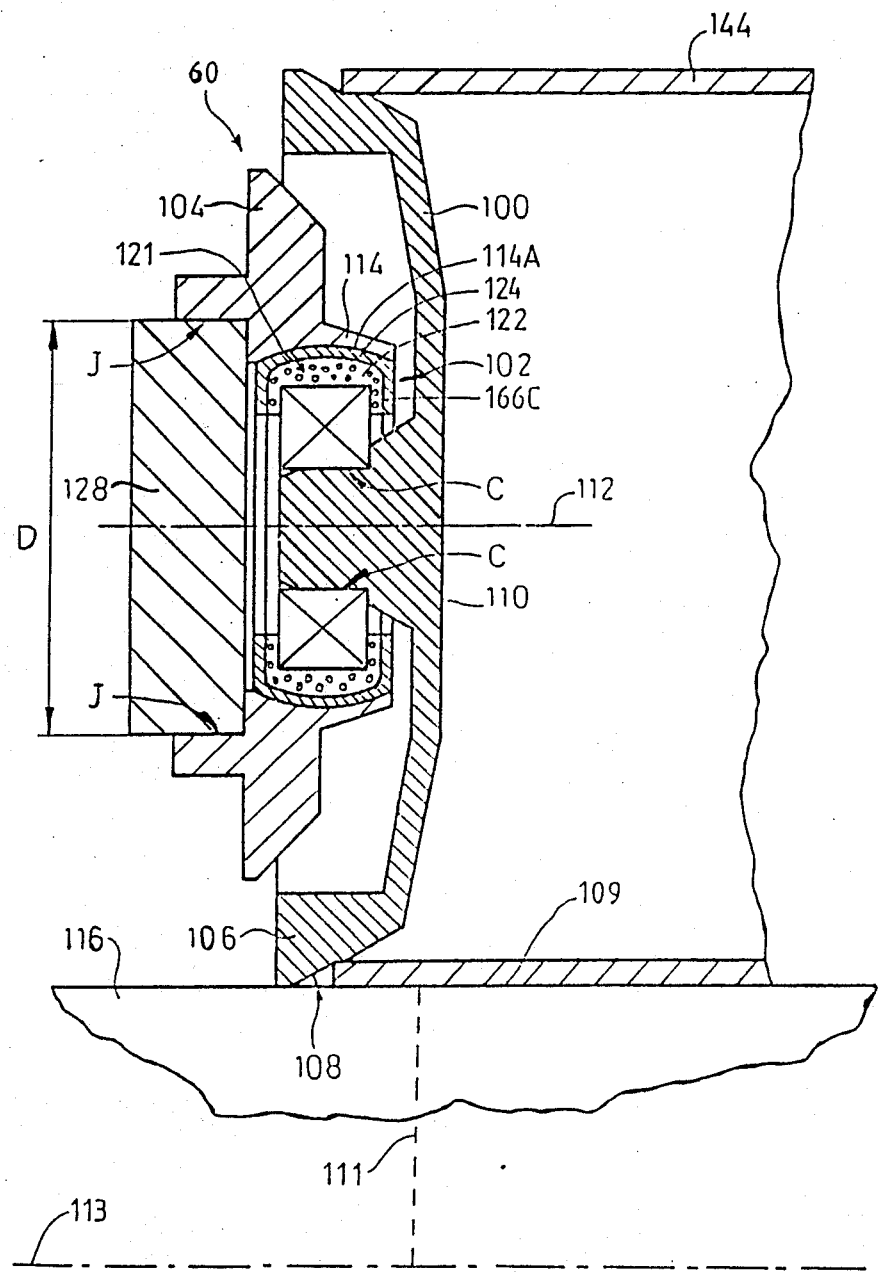
FIG. 3 is a vertical cross-section through an individual bobbin tube support containing a first exemplary embodiment of the inventive bearing unit in the bobbin tube support mechanism shown in FIGS. 1 and 2.

In many machines, however, a row of such cradles or bobbin tube support mechanisms 22 is provided and the cradles or bobbin tube support mechanisms 22 are arranged side by side with their pivot axes which are defined by the pins 18, in a more or less aligned horizontal direction. For cylindrical packages, a common rotatable or friction drive roll is provided for all of these cradles or bobbin tube support mechanisms 22. The rotatable or friction drive roll may be formed as a shaft of substantially constant diameter and extends past the complete row of cradles or bobbin tube support mechanisms 22 and substantially parallel to the pivot axes thereof. In such arrangement, the bobbin tube 44 or a bobbin tube 144 as shown in FIG. 3, must have an external diameter which is greater than the depth D of the associated support arms 28 and 38. In FIG. 3, one such support arm is indicated at 128 and corresponds with the first support arm 28 shown in FIGS. 1 and 2. The following paragraphs will describe the arrangement for supporting one end of the bobbin tube 144 relative to the support arm 128. Essentially the same arrangement can be used to support the bobbin tube relative to the other support arm which corresponds to the second support arm 38 shown in FIGS. 1 and 2.

When conical packages are to be wound, the filament take-up system may still have a common rotatable or friction drive roll or shaft for all winding positions. However, this common drive drive roll or shaft may carry individual roll-building portions or sleeves which are operatively associated with respective winding or take-up positions. In some arrangements of this type, each such sleeve is made up of a plurality of separately or individually rotatable sections arranged axially adjacent each other so that each section contacts a predetermined bobbin tube or a package thereon during operation. In a preferred arrangement such as disclosed in European Patent No. 63,690 and its cognate U.S. Pat. No. 4,415,125, granted Nov. 15, 1983, the disclosure of which is incorporated herein by reference, the sections are linked by a drive transmission.

The present invention is applicable to winding of both conical and cylindrical packages. The bobbin tube 144 shown in FIG. 3, therefore, may be assumed to be either conical or cylindrical. From the point of view of the present invention, it is irrelevant whether the rotatable roll or friction drive roll 116 engaging the bobbin tube 144 or the package wound thereupon, is a grooved drum traversing the filament, especially a yarn or thread, or whether a separate traverse mechanism is provided to enable formation of crosswound packages.

The first exemplary embodiment of the inventive bobbin tube support mechanism 22 contains a bobbin tube support 60 which is illustrated in section in FIG. 3 and essentially comprises three elements, namely a bobbin tube engaging member or bobbin tube receiving plate or disc 100, a first exemplary embodiment of the inventive bearing unit generally indicated by the reference numeral 102 and to be described in detail further hereinbelow, and a support ring or member 104 receiving the bearing unit 102 and secured to the support arm 128 by conventional and therefore not particularly illustrated securing means.

The receiving plate or disc 100 has at its outer edge a flange 106 formed with a generally truncated cone portion which actually engages the bobbin tube 144. At its center, the disc 100 has a stub shaft 110 which is a press fit in the bearing unit 102. The disc 100 is thus rotatable about a bearing rotational axis 112 of the bearing unit 102.

The support ring or support member 104 also possesses a flange 114 defining part of a socket 114A for receiving the bearing unit 102 which constitutes means defining a bobbin tube rotation axis, which coincides with the bearing rotational axis 112. The internal surface of the socket 114A is part-spherical and cooperates with a corresponding part-spherical surface at a mounting portion 124A of the bearing unit 102, see FIG. 4. The flange 114 is elastically expandable so that the bearing unit 102 can be snap-fitted into the receiving socket 114A. The arrangement is generally in accordance with that shown in German Patent No. 1,560,475 and the aforementioned cognate U.S. Pat. No. 3,286,948.

The bearing unit 102 is supported at the support arm 128, and a corresponding bearing unit is supported essentially in the same manner at the other support arm of the cradle or bobbin tube support mechanism 22. The bearing units may be able to shift in their respective sockets so that, after mounting of the bobbin tube 144, the bearing rotational axes 112 of the bearing units 102 adapt to the disposition of the bobbin tube 144 and define the aforementioned tube rotation axis. It has been found, however, that this does not suffice to ensure that the bobbin tube 144 immediately makes line contact with the rotatable roll or friction drive roll, part of which is diagrammatically indicated at 116 in FIG. 3. In practice, it is very often found that either one end or the other end of the bobbin tube 144 makes contact with the rotatable or friction drive roll 116 first, and the "universal mounting" provided by the socket 114A receiving the bearing unit 102, is insufficient to compensate for the misalignment. The misalignment may be due, for example, to faults in the tube form which may be caused by damage thereto, or to poor orientation of the bobbin tube 144 relative to the support disc 100.

Such misalignment can be compensated by the first exemplary embodiment of the inventive bearing unit 102 for installation in the first exemplary embodiment of the inventive bobbin tube support mechanism 22 of the inventive filament, especially yarn or thread take-up system 1 shown in FIGS. 1 and 2. A modified embodiment or construction 102A of the bearing unit 102 is shown more clearly in the more detailed illustration of FIG. 4. Such FIG. 4 also illustrates a specific mode of manufacturing the bearing unit 102A, which mode of manufacturing is not considered essential to the invention.

Figure 4:
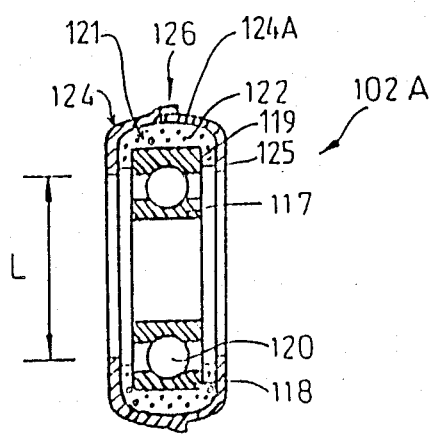
FIG. 4 shows a cross-section through a modified embodiment of the inventive bearing unit for use in the bobbin tube support shown in FIG. 3 and indicates one possible manner of manufacturing such bearing unit.

As seen in FIG. 4, the bearing unit 102A is constructed as an anti-friction bearing containing an inner bearing element or race or ring 117, an outer bearing element or race or ring 118 and anti-friction bodies in the form of ball bearings 120 running on the bearing elements or races 117 and 118 in order to enable their rotation relative to each other about the bearing rotational axis 112. The outer race 118 is embedded in a resilient means or ring 122 which constitutes a body of resiliently compressible porous elastomeric material to be described in further detail hereinbelow. The bearing is encased in a shell or mounting member 124 made up of left-hand and right-hand sections which are joined in an annular median or joint zone 126 substantially at right angles to the bearing rotational axis 112. In the illustrated arrangement, the joint zone 126 is made by overlapping portions of the two sections and securing these overlapping portions to each other by means of an adhesive. However, any other alternative joining technique could be used and any other convenient technique could be used to provide a suitable shell around the bearing. The shell or mounting member 124 provides the mounting portion 124A and the associated, previously mentioned part-spherical surface which is received in the socket 114A of the support ring 104.

It will be apparent from FIGS. 3 and 4 that the resilient means or ring 122 constituting the body of resiliently compressible, porous elastomeric material is arranged between two relatively rigid parts, namely the outer bearing element or race 118 and the shell or mounting member 124 which adjoin the resilient means or ring 122 of porous elastomeric material. The resilient means or ring 122 is constructed and arranged such as to hold the first relatively rigid part, namely the outer bearing element or race 118 or the bearing elements 117, 118 of the bearing unit 102, at a predetermined disposition relative to the second relatively rigid part, namely the shell or mounting member 124. In this manner, the second relatively rigid part, i.e. the shell or mounting member 124 defines a restricted space 121 which accommodates the resilient means or ring 122.

The resilient means or ring 122 is selected so as to be compressible between the relatively rigid parts, i.e. the outer bearing element or race 118 and the shell or mounting member 124 under the force urging the bobbin tube 144 or the package wound thereupon into contact with the rotatable or friction drive roll 116 during operation. The means for producing such a force have only been schematically illustrated in the drawings because such means are conventionally constructed like, for example, a spring-weighted system as illustrated in British Patent No. 1,349,425. Any other suitable method for providing a controlled force urging the bobbin tube 144 or the package wound thereupon into contact with the rotatable or friction drive roll 116 can be used, for example, a selectively pressurizable unit. Such force-producing means thus have been generally indicated in FIG. 1 by reference character 200. The forces created by such force-producing means 200 may be of the magnitude conventionally used for winding of thread packages in, for instance, rotor spinning machines as described, for example, in European Patent Nos. 126,352 and 127,017, backwinding machines as described, for example, in U.S. Pat. Nos. 3,971,520 and 3,356,306, texturizing machines as described, for example, in British Patent No. 1,399,891 or any other type of processing machine used in combination with a filament take-up system.

The diameter L (FIG. 4) of the inner edges of the shell or mounting member 124 is less than the exterior diameter of the outer race or bearing element 118. The resilient means or ring 122 extends radially inwardly between the axial end walls or side flanges 125 of the shell or mounting member 124 and the corresponding axial or end faces 119 of the outer bearing element or race 118. Accordingly, the ball bearing made up of the two bearing elements or races 117 and 118 and the bearing balls 120 is securely retained in the shell or mounting member 124 but is free to adjust or to be displaced in response to applied forces relative to the shell or mounting member 124 within the limits determined by the compressibility of the resilient means or ring 122. As will be explained in greater detail hereinbelow, the outer bearing element or race 118 is preferably free to move substantially in radial direction but is relatively restrained from moving in substantially axial direction.

As a result of the applied forces, the first relatively rigid part, namely the outer bearing element or race 118 or the bearing elements 117, 118 of the bearing unit 102 which adjoins and is held by the resilient means or ring 122, can move away from the aforementioned predetermined disposition relative to the second relatively rigid part, i.e. the shell or mounting member 124 against the bias or resilient force of the resilient means or ring 122. Adjustment in response to the applied forces is enabled by compression of the resilient means or ring 122 in the restricted space 121 between the outer bearing element or race 118 and the radially outer, substantially cylindrical wall of the shell or mounting member 124.

In the illustrated embodiment, the restricted space 121 is more closely restricted in directions extending substantially parallel to the bearing or tube rotation axis 112 than in directions extending substantially parallel to a connecting line 111 which connects the predetermined roll axis 113 and the contact zone 109 formed between the friction drive roll 116 and the bobbin tube 144 or the package forming thereupon. Therefore, the first relatively rigid part, i.e. the outer bearing element or race 118 or the bearing elements 117, 118 of the bearing unit 102, can be displaced relative to the second relatively rigid part, i.e. the shell or mounting member 124, substantially radially with respect to the bearing or tube rotation axis 112 but is restrained from a displacement substantially parallel to such bearing or tube rotation axis 112.

The resilient means or ring 122 is elastic to enable its recovery when the deforming applied force is removed, and should retain this elasticity despite repeated deformation, i.e. the material of the resilient means or ring 122 should have negligible or at the most a tolerable compression set through a given operating life span.

Polyurethane elastomers of the type available under the trade marks "CELLASTO" and "SYLOMER" can be used. Both resiliently compressible materials are available from the company Angst & Pfister AG of Zurich, Switzerland. Merely by way of example, the following dimensions are quoted for a bearing unit 102A suitable for use in the cradle or bobbin tube support mechanism 22 of the filament take-up system 1 in combination with a rotor spinning machine of the type supplied by the Assignee of the present application under the designation M2/1:

diameter of the part-spherical surface on shell 124: 24 mm;

length of the bearing unit 102A along the bearing axis 112: 9 mm;

external diameter of the outer race 118: 19 mm;

diameter L (FIG. 4): 15 mm; and thickness of the metal sheet used in manufacturing the shell 124: 0.5 mm.

The resilient means or ring 122 may be under compression under all operating conditions after manufacture of the bearing unit 102A. The porous elastomeric materials referred to above enable very high degrees of volume compressibility so that misalignments of up to approximately 2 mm may be compensated for by means of the bearing unit 102A dimensioned as above.

In the foregoing description, the preferred arrangement has been assumed in which a bearing unit in accordance with the invention is provided on each cradle or support arm 28 and 38. This is not essential, but in cases in which the inventive bearing unit is provided on one support arm only, the cradle or bobbin tube support mechanism must be set relative to the rotatable or friction drive roll 116 such as to ensure that the end of the bobbin tube 144 which does not have a bearing unit in accordance with the invention, cannot contact the friction drive roll 116.

Figure 3A:
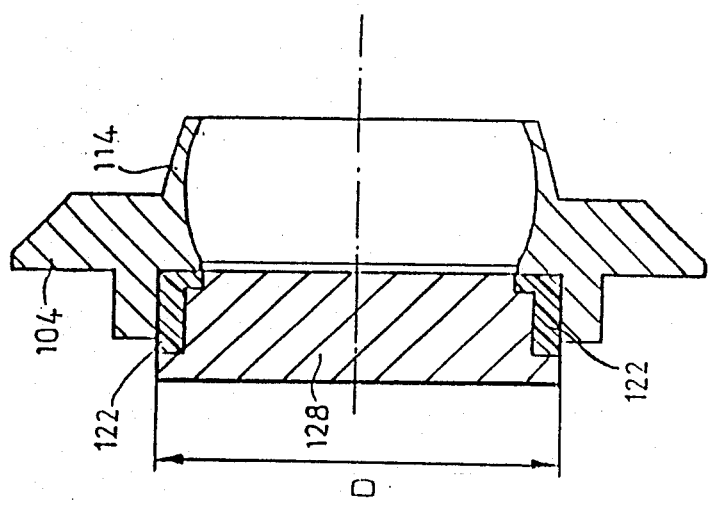
FIG. 3A is a fragmentary detail of FIG. 3 showing a further modification wherein resilient means are interposed between a support member and a support arm.
Figure 3B:
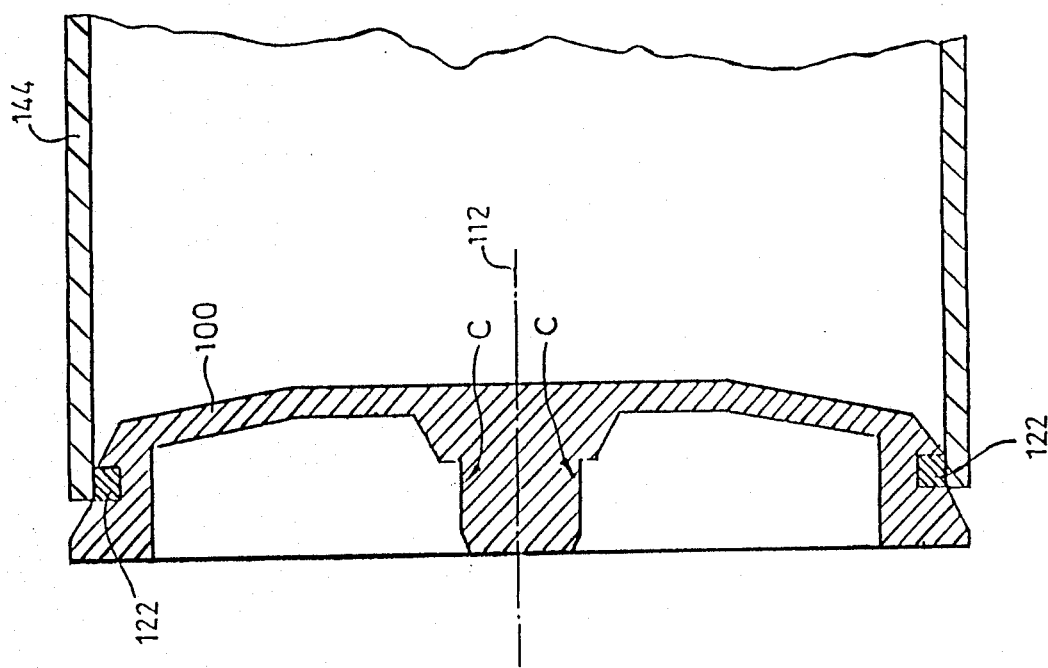
FIG. 3B is a fragmentary detail of FIG. 3 depicting a further modification wherein the resilient means is interposed between a bobbin tube engaging member and a bobbin tube.

The invention is not limited to details of the embodiment shown in FIGS. 3 and 4. In particular, it is not essential to incorporate the resilient means or ring 122, i.e. the body of resiliently compressible or deformable material into the bearing unit, although that is the preferred arrangement. By way of example only, the body of resiliently compressible material instead may be incorporated into the region of the joint J shown in FIG. 3 between the support arm 128 and the support ring 104. Such an arrangement has been depicted in FIG. 3A wherein the resiliently compressible material or resilient means 122 is shown interposed between the support arm 128 and the support ring 104. Alternatively, such body may be provided in the region of the connection C between the stub shaft 110 and the inner bearing element or race 117 of the bearing. Theoretically, the body of resiliently compressible material even may be incorporated into the structure of the tube receiving plate or disc 100, particularly in the region of contact with the bobbin tube 144. Such an arrangement has been depicted in FIG. 3B where the body of resiliently compressible material or resilient means 122 is arranged in the tube receiving plate or disc 100 and contacts the bobbin tube 144. However, in such case the body is liable to be subjected to destructive frictional contact with the bobbin tube 144, and it is recommended that this arrangement should be avoided wherever possible, although it is still considered to fall within the broad scope of the invention.

Figure 3C:
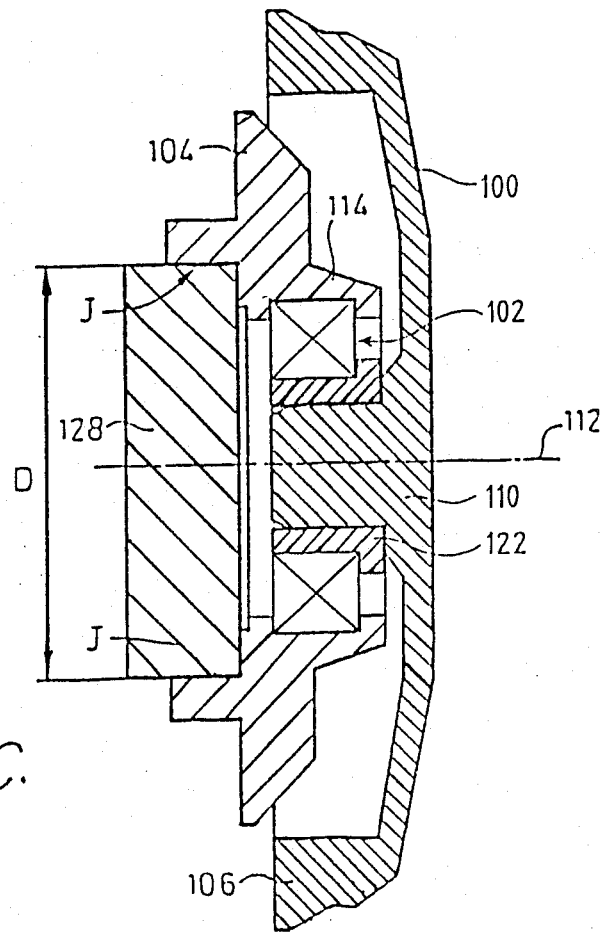
FIG. 3C is a fragmentary detail of FIG. 3 depicting a still further modification wherein the resilient means is interposed between a bearing unit and a stub shaft of a bobbin tube engaging member or bobbin tube receiving plate or disc.

A further possibility has been depicted in FIG. 3C wherein the body of resiliently compressible material or resilient means 122 is shown interposed between the bearing unit 102 and the stub shaft 110 of the bobbin tube engaging member or bobbin tube receiving plate or disc 100.

Furthermore, it is not necessary to incorporate the resilient means or body of the resiliently compressible material into the tube support 60 connecting the tube receiving plate or disc 100 to the cradle or support arm 128. The body of resiliently compressible material can be installed further back in the filament take-pp system 1. A variety of possible tube support mechanisms are schematically shown in the sketches of FIGS. 5A to 5F. In each of the sketches 5A to 5F, the support means or yoke of the cradle or bobbin tube support mechanism 22 is indicated at 24 and the support arms at 28 and 38.

In FIG. 5A resilient means or blocks 130 of resiliently compressible material are located intermediate support arm sections 28A, 28B and 38A, 38B of each subdivided cradle or support arm 28, 38 and provide the required resilient compressibility.

In FIG. 5B, the support means or yoke 24 is rotatable about a pivot shaft 132 which selectively enables winding of cylindrical or conical packages; the cone angle of the conical packages also can be adjusted by rotation of the support means or yoke 24 about the axis of the pivot shaft 132. In this arrangement, resilient means or a sleeve 134 constituting the body of resiliently compressible material is adjoined by the stub or pivot shaft 132 and bearing member 135 surrounding the pivot shaft 132.

In the arrangement shown in FIG. 5C, resilient means or blocks 136 of resiliently compressible material are provided at the region of the junctions between the support means or yoke 24 and the support arms 28 and 38.

In the bobbin tube support mechanism shown in FIG. 5D, the support means or yoke 24 is subdivided into two halves or sections 24A and 24B which are joined by a resilient means or block 140 of resiliently compressible material.

In the FIG. 5E arrangement, the body of resiliently compressible material is provided as a resilient means or sleeve 142 in the region of the pivot joint or pin 34 between the support arm 38 and the support means or yoke 24; in this case, only the support arm 38 can adapt to misalignments as described above.

In the FIG. 5F bobbin tube support mechanism, the support means or yoke 24 is secured to a support plate 145 which is pivotable about a pivot pin 146 located below the cradle or tube support mechanism. As a result the cradle or tube support mechanism can be adapted to varying cone angles. The body of resiliently compressible material is provided as a resilient means or sleeve 148 located between the support plate 145 and the pivot pin 146.

The invention also is not limited to double-armed cradles or bobbin tube support mechanisms of the type as shown in FIGS. 1 to 5F. Alternative tube support mechanisms are known, for example, from U.S. Pat. No. 3,971,520. The use of resilient means in the form of a body of resiliently compressible or deformable material in order to enable compensation of misalignments in such bobbin tube support mechanisms is included within the scope of the present invention.

The inventive tube support mechanisms provide advantages for winding both cylindrical and conical packages. In both cases, line contact is ensured in the contact zone 109 between the bobbin tube or the package wound thereupon and the rotatable or friction drive roll and the inventive body of resiliently compressible or deformable material also tends to absorb small misalignments and shocks during the winding operation, thereby adapting to vibrations in the filament take-up system.

The advantages of the invention appear in particular, however, during the winding of conical packages, and especially in cooperation with automatic piecing systems for spinning machines of the type as disclosed, for example, in European Patent No. 127,017. In such thread take-up systems, withdrawal of the thread from a spinning unit after piecing is effected by a withdrawal system such as, for example, a pair of rotatable withdrawal rolls which operate at a predetermined rotational speed independently of the thread take-up system. A temporary thread store may be provided between the withdrawal system and the thread take-up system. The take-up speed immediately following contact of a conical bobbin tube with the rotatable or friction drive roll may be very different, however, depending upon which end of the bobbin tube initially contacts such drive roll. This variability can be substantially eliminated by ensuring line contact.

The present approach is to be contrasted with an alternative in which the rotatable or friction drive roll is deliberately formed so as to contact only a localized region of the bobbin tube such as described, for example, in U.S. Pat. No. 4,266,734. The approach put forward in the present application is particularly useful in filament take-up systems of the type as described in U.S. Pat. No. 4,415,125, which was granted on Nov. 15, 1983, to the Assignee of the instant application. In such system contacts of both ends of the bobbin tube with the friction drive roll is desirable. However, the damping advantages of the inventive body of resiliently compressible or deformable material are available even where line contact is not required.

In addition to the inventive bobbin tube support mechanism, the present invention also provides the inventive bearing unit, a first and a modified embodiment of which have been described hereinbefore with reference to FIGS. 3 and 4. Such inventive bearing unit 102 or 102A comprises a pair of relatively rotatable bearing elements, namely the inner bearing element or race or ring 117 and the outer bearing element or race or ring 118, a mounting member, namely the shell 124 and resilient means or a body 122 of resiliently compressible or deformable material. The resilient means or body 122 is located in a restricted space 121 formed between the bearing elements 117, 118 and the shell or mounting member 124 and retains the bearing elements 117, 118 in a predetermined disposition relative to the shell or mounting member 124. Due to its resilient compressibility, the resilient means or body 122 permits adjustment of the bearing elements 117, 118 relative to the shell or mounting member 124 within the limits determined by the compressibility or deformability of the resilient means or body 122.

Many different types of bearings may be provided to ensure relative rotatability of the bearing elements 117 and 118. For example, the bearing balls 120 shown in FIG. 4 may be replaced by barrel elements, needles, or a plane or journal bearing system. Clearly, the resilient means or body 122 preferably coacts with only one of the bearing elements 117 or 118 and the shell or mounting member 124. In bearing constructions of the presently described type in which the bearing elements are arranged as inner and outer bearing elements and the inner bearing element is rotatable within the outer bearing elements, the shell or mounting member may be provided either within the inner bearing element or around the outer bearing element, the latter arrangement being illustrated in FIGS. 3 and 4. In the former case, the resilient means or body of elastomeric, resiliently compressible material coacts with the inner bearing element and the shell or mounting member, whereas in the latter case, as illustrated, such resilient means or body 122 coacts with the outer bearing element 118 and the shell or mounting member 124.

The shell or mounting member 124 may be made of sheet metal or other suitable casing material, e.g. synthetic or plastic materials. It may be formed in sections of the type as described with reference to FIG. 4, or in one piece. The sections may be joined in planes at right angles to the bearing axis 112 as illustrated or in planes containing such bearing axis.

It is not, however, essential to provide a special bearing unit including a mounting member such as the shell 124 and the resilient means or ring 122 between the shell or mounting member 124 and the bearing elements 117 and 118. An alternative arrangement as illustrated in FIG. 6 is used for supporting the smaller end of a conical bobbin tube, the larger end of which can be assumed to be supported by a bearing unit 102 as shown in FIG. 3.

In FIG. 6, a bobbin tube support 60A contains a bobbin tube engaging disc 150 having a generally dish-shaped body portion 152 with an outwardly projecting flange 154 at the open side of the dish. During use, the dish-shaped body portion 152 projects into the open end of the bobbin tube until the axial end face of the bobbin tube engages the flange 154.

The disc 150 is mounted at the support arm (not shown) of a cradle or bobbin tube support mechanism by means of a connector comprising a connector pin 156 and a flange 158 at one end of the connector pin 156. The flange 158 is secured by any conventional and therefore not shown securing means to a cradle or support arm so that the longitudinal axis of the connector pin 156 extends substantially parallel to the predetermined roll axis of the rotatable or friction drive roll (such as drive roll 116 in FIG. 3). The connector pin 156 projects from its associated support arm towards the other support arm (such as the support arm 128 in FIG. 3) of the cradle or bobbin tube support mechanism 22. A rotational bearing comprising, for example, inner and outer bearing elements or races and ball bearings as shown in FIG. 4, is generally indicated at 160. This rotational bearing 160 is suitably secured to the connector pin 156, for example, by press-fitting the inner bearing element or race onto the outer substantially cylindrical surface of the connector pin 156 as illustrated in FIG. 6.

Another type of securing connection is illustrated in FIG. 7 which shows snap-fit connection means 155. A connector pin 156A of the snap-fit connection means 155 is mounted at the associated support arm by means of the flange 158 and contains a slot 157 and bulges 159 at its free end and for retaining the bearing 160. The inner bearing element or race of the bearing 160 forms a mounting portion 156B of the snap-fit connection means 155.

A resilient means or ring 162 or body of porous elastomeric, resilient compressible material, similar to the ring 122 shown in FIG. 4, is inserted between the outer bearing element or race and the substantially cylindrical surface of the dish-shaped body portion 152. The resilient means or ring 162 can be adhesively bonded to the associated surfaces or both these elements in order to retain the bobbin tube engaging disc 150 relative to the bearing 160.

The resilient means or ring 162 functions substantially in the same manner as the ring 122 and enables limited relative movement of the relatively rigid parts, in this case the bobbin tube engaging disc 150 and the bearing 160, which adjoin the resilient means or ring 162. This resilient means or ring 162 also absorbs and damps shocks and vibrations transmitted from the contact zone formed between the bobbin tube and the rotatable or friction drive roll. However, this arrangement is subject to an additional problem which does not exist in the arrangement shown in FIG. 3. Namely, the resilient means or ring 162 also is required to transmit torque from the bobbin tube engaging disc 150 to the outer bearing element or race of the bearing 160. This may lead to premature failure of the assembly if the resilient means or ring 162 is unable to withstand the involved loads or stresses. In such case the resilient means or ring 162 must be placed at a different assembly location at which the resilient means or ring 162 is no longer required to transmit torque, e.g. between the bearing 160 and the pin at the support arm instead of between the bearing and the bobbin tube or package, or still further back in the cradle or bobbin tube support mechanism as indicated in FIGS. 5A to 5F.

In any event, the readily releasable snap-fit connection means 155 provided between the bobbin tube engaging disc 150 and the support arm (not illustrated) as illustrated in FIG. 7 is preferred due to the snap-fit connection between the bearing 160 and the connector pin 156A. This type of connection enables the tube engaging disc 150 to be readily removed from the associated support arm for clearance from any thread or the like which has penetrated into the space between the bearing or disc unit formed by the tube engaging disc 150, the bearing 160 and the resilient means or ring 162 as shown in FIGS. 6 and 7, and the associated support arm. Such problem is particularly likely to arise at the smaller end of a conical package.

Furthermore, at the smaller end of the conical bobbin tube, a snap-fit element such as the connector pin 156A is preferred to the snap-fit socket 114A shown in FIG. 3, because space is extremely scarce at the smaller cone end. At the same time, a slightly loose fit of the bearing or disc unit on the connector pin 156A is acceptable provided the bearing or disc unit is securely retained at the associated support arm. Misalignments are then taken up by the resilient means or ring 162, always assuming that such resilient means or ring 162 is able to withstand the rotational loading. If the latter requirement is not fulfilled, the resilient means or body 162 must be placed at a different location further back in the cradle or bobbin tube support mechanism as shown in FIGS. 5A to 5F if the snap-fit connection means 155 and the connector pin 156A are intended to be maintained.

The slot 157 of the connector pin 156A effectively lies in a plane which should be disposed substantially at right angles to the length of the associated support arm (not shown). Thus, the force urging the cradle support arm towards the rotatable or friction drive roll does not tend to release the coupling between the bearing or disc unit and the associated support arm.

In the embodiments thus far described, the pores in the body of the elastomeric, resiliently compressible material provide "free space" between the relatively rigid parts which adjoin the body, i.e. the resilient means or ring 122, 162, as the case may be. The elastomeric or resiliently compressible material can be deformed to at least partially fill such free space by closing some of the pores. There is thus permitted the required relative positional adjustment between the first and second relatively rigid parts in order to thereby enable the desired line contact of the bobbin tube or the package wound thereupon with the rotatable or friction drive roll.

If the resiliently compressible body does not contain pores, there can be provided instead a series of ridges or equivalent projections which engage the shell or mounting member or the associated facing surface of the bearing. Volume compressibility may then be enabled by deformation of the body of material into spaces which exist between such ridges or projections. Such body of resiliently deformable material can also be used in the bobbin tube support mechanisms of the type shown in FIGS. 5A to 5F.

Further embodiments containing free or restricted spaces to receive resiliently deformed body material will now be described with reference to the remaining Figures, all of which show a shell or mounting member like the shell or mounting member 124 of the bearing unit 102A shown in FIG. 4.

In a second exemplary embodiment of the inventive bearing unit and the inventive tube support mechanism shown in FIG. 8, the shell or mounting member is again indicated at 124 and made up by joining two sections or halves in an annular median or joint zone 126. The bearing unit 102B again comprises inner and outer bearing elements or races 117 and 118, respectively, and ball bearings 120, all as already shown in FIG. 4. Resilient means in the form of a ring 164 is adjoined by two relatively rigid parts, namely a first relatively rigid part formed by the outer bearing element or race 118 of the bearing unit 102B and a second relatively rigid part formed by the shell or mounting member 124. The resilient means or ring 164 is made of a compact body of elastomer or resiliently deformable material, i.e. the body of the resilient means or ring 164 does not contain pores like the resilient means or ring 122 illustrated in FIGS. 3 and 4.

The resilient means or ring 164 has an annular groove which is not specifically indicated and opens radially inwardly between a pair of side flanges 166. The groove receives the outer bearing element or race 118 of the bearing unit 102B. The side flanges 166 are clamped between the side walls or end faces 119 of the outer bearing element or race 118 and the associated side walls of side flanges 125 of the shell or mounting member 124.

The resilient means or ring 164 thus, as described hereinbefore with reference to FIG. 4, is located in a restricted space 121 defined between a first relatively rigid part namely the outer bearing element or race 118 of the bearing unit 102B, and a second relatively rigid part, namely the shell or mounting member 124, which relatively rigid parts 118 and 124 adjoin the resilient means or ring 164. The first relatively rigid part or outer race 118 is movable in the restricted space 121 relative to the second relatively rigid part or shell 124 under the action of applied forces and against the bias or resilient force of the resilient means or ring 164. The first relatively rigid part or outer race 118 is held at a predetermined disposition by the resilient means or ring 164 in the unloaded condition, i.e. in the absence of applied forces. Since the material of the resilient means or ring 164 has no pores and, therefore, the side flanges 166 are resistant against deformation under forces which act upon the bearing unit 102B substantially in axial direction. The bearing unit 102B and the shell or mounting member 124 thus are firmly secured relative to each other in the axial direction.

FIG. 8 illustrates the bearing unit 102B in its "normal" or unloaded condition, i.e. in the absence of the aforementioned applied forces. As viewed in section, the radially outwardly facing surface of the resilient means or ring 164 is formed with a rounded apex 168 in alignment with the annular median or joint zone 126 of the shell or mounting member 124. Such outer surface slopes away in both directions from the apex 168 towards the side flanges 125 of the shell 124. There are thus defined two annular chambers or free spaces 170 and 172 between the resilient means or ring 164 and the shell or mounting member 124 on either side of the rounded apex 164.

Assuming that the bearing unit 102B of FIG. 8 is substituted for the bearing unit 102 in a cradle or bobbin tube support mechanism 22 of the type shown in FIG. 3, all other parts remain the same. The support arm 128 is now applying a weighting force to the shell or mounting member 124, urging the bobbin tube 144 downwardly as viewed in FIG. 3 and into contact with the rotatable or friction drive roll 116. The stub shaft 110 of the tube receiving plate or disc 100 is applying an opposing reaction force to the bearing unit 102B. The upper portion of the resilient means or ring 164 is squeezed between the outer bearing element or race 118 and the shell or mounting member 124. At first, the forces act wholly in the narrow strip of contact between the apex 168 and the shell or mounting member 124 at the top of the bearing unit 102B as viewed in FIG. 3. The apex 168, therefore, is squashed in this contact strip and the required deformation of the resilient means or ring 164 is effected by bulging of the resilient means or ring 164 into the annular chambers or free spaces 170 and 172.

If the support arm 128 happens to be supporting an end of the bobbin tube 144 which comes into contact with the rotatable or the friction drive roll 116 before the other tube end, then the total weighting force applied to the cradle or bobbin tube support mechanism 22 will be acting in the contact strip just described. The degree of deformation of the resilient means or ring 164 will be correspondingly great, and deformation will continue until one of two results is achieved:

(i) the other end of the bobbin tube 144 comes into contact with the rotatable or friction drive roll 116 and the total weighting force is shared between the cradle or support arms 28 and 38. This would represent a desired result;

(ii) the uppermost portions of the annular chambers 170 and 172 in the upper region of the bearing unit 102B are filled with the resiliently deformable material by deformation of the resilient means or ring 164 from its normal position so that the resilient means or ring 164 cannot be further deformed. This would represent an undesired result.

Figure 9:
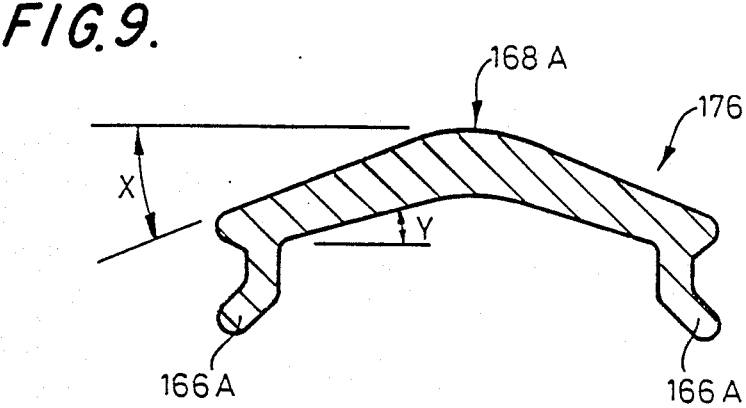
FIG. 9 shows the cross-section of an alternative form of a resilient ring for use with a third exemplary embodiment of the inventive bearing unit.
Figure 10:
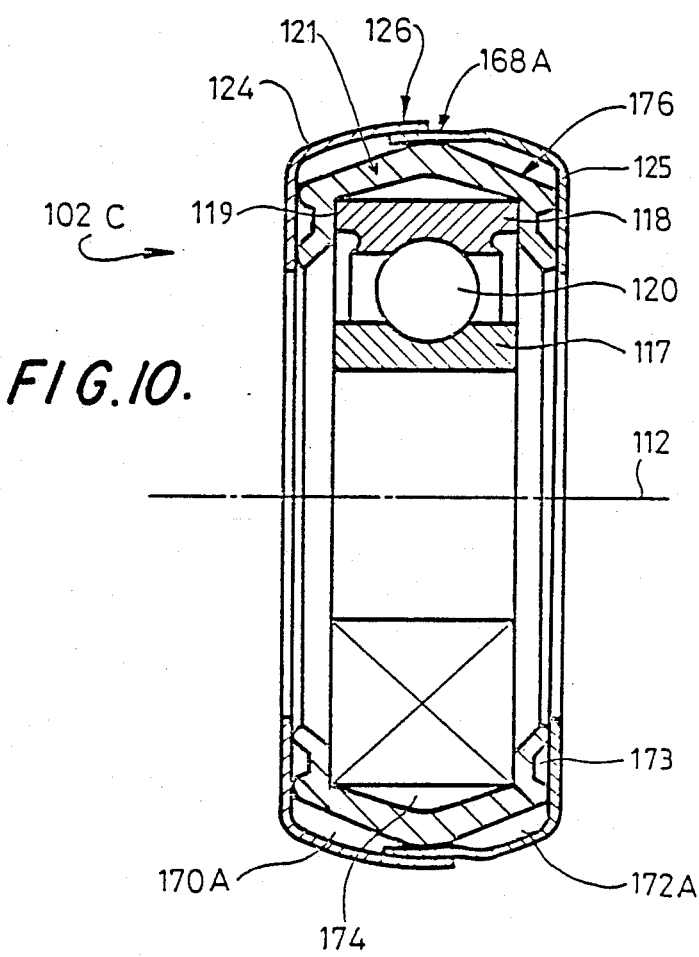
FIG. 10 shows a cross-section through the third exemplary embodiment of the inventive bearing unit including the resilient ring shown in FIG. 9 and for use in a third exemplary embodiment of the inventive bobbin tube support mechanism.

In the latter case, either the cradle or bobbin tube support mechanism 22 should be readjusted to reduce misalignment and hence the degree of compensation demanded from the resilient means or ring 164. Otherwise, the bearing unit 102B must be re-designed to provide a greater restricted space 121 between the outer bearing element or race 118 and the shell or mounting member 124 of the bearing unit 102B and hence a greater restricted space 121 for accommodating the deformation of the resilient means or ring 164. FIGS. 9 and 10 show a solution for this type of problem.

The bearing unit 102C shown in FIG. 10 is constructed and operates substantially in the same basic manner as the bearing unit 102B shown in FIG. 8 so that the foregoing basic description of the components and their principle of operation also applies to the embodiment illustrated in FIG. 10 which shows a third exemplary embodiment of the inventive bearing unit and thus a third exemplary embodiment of the inventive bobbin tube support mechanism. The main body of the resilient means or ring 176, however, is formed as an arch as viewed in the cross-section shown in FIG. 9. The arch has a side flange 166A at each end and these side flanges 166A also define the lateral boundaries of an annular groove receiving an outer bearing element or race 118. Normally, i.e. before deformation of the resilient means or ring 176, the axial edges of the outer race 118 engage the internal ends of the arch as shown in FIG. 10.

Accordingly, before contact of the bobbin tube 144 with the rotatable or friction drive roll 116, three annular chambers are defined between the radially outwardly facing, substantially cylindrical surface of the outer bearing element or race 118 and the radially inwardly facing, substantially cylindrical surface of the shell or mounting member 124, namely the annular chambers or free spaces 170A and 172A corresponding with the chambers 170 and 172 shown in FIG. 8, and the additional chamber or free space 174 present between the arch and the outer race 118. Deformation of the resilient means or ring 176 can be continued until the arch is squashed flat in one region thereof around its periphery.

The arch shown in FIGS. 9 and 10 represents a preferred embodiment. By way of example only, the angle X in FIG. 9 may be in the range of about 20° to about 25° and the angle Y in the range or about 13° to about 18°.

The apex 168A of the arch preferably contacts the shell or mounting member 124 around its full circumference so that the outer bearing element or race 118 and the shell or mounting member 124 which constitute first and second relatively rigid parts adjoining the resilient means or ring 176, adopt a defined relative position substantially in radial direction before a load or force is applied to the bearing unit 102C. This is not essential, however; a small gap might be left to be taken up by deformation of the resilient means or ring 176.

As shown in FIG. 10, each side flange 166A can be formed as an "auxiliary arch" opening outwardly substantially in the axial direction with the formation of a further free space 173. This auxiliary arch or further free space 173 can be designed to give some degree of freedom for relative displacement of the outer bearing element or race 118 and the shell or mounting member 124 substantially in the axial direction, while being sufficiently stiff to strongly resist such displacement. The bearing axis 112 of the bearing unit 102C thus tends to be held in a desired alignment relative to the shell or mounting member 124, but some "give" or yield is inserted if required by the auxiliary arches or further free spaces 173. Where possible, the side flanges 166A are made solid.

Figures 11A, 11B:
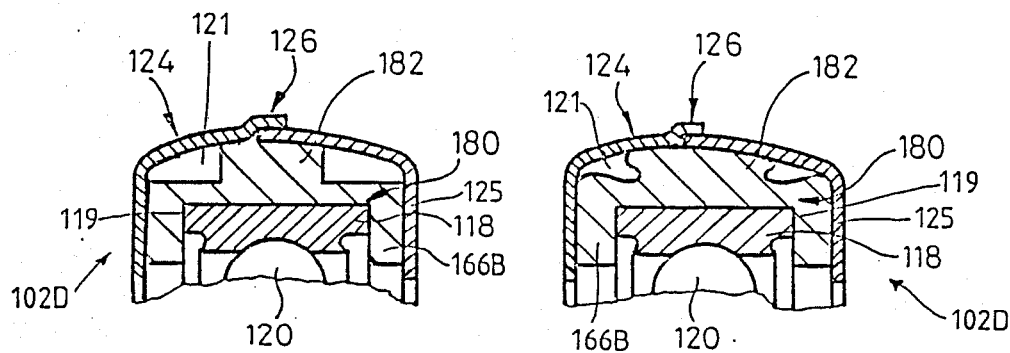
FIGS. 11A and 11B respectively show, in the absence and in the presence of applied forces, a fourth exemplary embodiment of the inventive bearing units for use in a fourth exemplary embodiment of the inventive bobbin tube support mechanism.

FIGS. 11A and 11B illustrate a fourth embodiment of the inventive bearing unit and thus of the inventive bobbin tube support mechanism and only show the top portion of a bearing unit 102D in the absence and in the presence of an applied force or load, respectively. The parts indicated at 118, 119, 121, 124, 125 and 126 correspond with respect to structure and function to the equally numbered parts in FIGS. 3, 4, and 8 to 10. A resilient means or ring 180 has a substantially central, outwardly projecting ridge 182 engaging the shell or mounting member 124 in the annular median or joint region 126 The width of the ridge 182 represents about ¼ to about ⅓ the axial length of the resilient means or ring 180 in the non-deformed condition, i.e. in the absence of weighting forces acting upon the bobbin tube (FIG. 11A). The height of the ridge 182 then represents about ⅓ to about ½ the radial thickness of the resilient means or ring 180 with the exception of the side flanges 166B clamped between the axial walls or side flanges 125 of the shell or mounting member 124 and the end faces 119 of the outer bearing element or race 118.

In the presence of applied or weighting forces (FIG. 11B), the ridge 182 is squashed between the substantially cylindrical wall of the shell or mounting member 124 and the outer bearing element or race 118, and "shoulders" form on the main body of the resilient means or ring 180.

Figure 12:
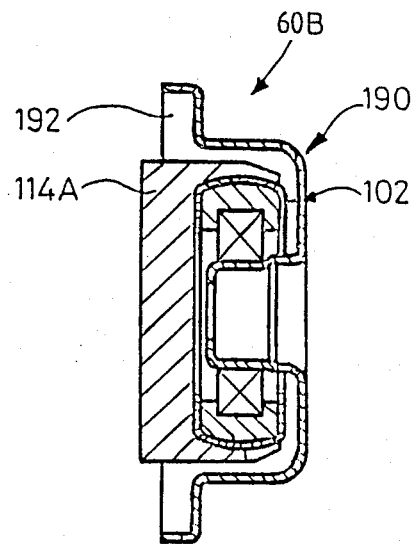
FIG. 12 shows in a view similar to FIG. 6, an alternative form of a bobbin tube support for supporting the smaller diameter end of a conical bobbin tube.

FIG. 12 shows an alternative arrangement or bobbin tube support 60B suitable for the smaller end of a conical bobbin tube and alternative to the bobbin tube support 60A shown in FIG. 6. The support arm (not shown) again carries a socket 114A which receives the bearing unit 102 which may have the construction of any one of the bearing units 102 to 102D shown in FIGS. 3, 4, 8, 10 and 11. The bobbin tube engaging disc 190 of the present bearing unit 102 is of thin-walled design and a correspondingly strong material, e.g. steel is selected therefor. The disc 190 has a flange 192 providing extra protection against penetration of threads into the region of the bearing if such threads slip off the end of the bobbin tube.

It will be noted that the resilient means or rings 164 and 176 as shown in FIGS. 8 and 10 are specifically formed to give preferential directions of relative displacement of the outer bearing element or race 118 and the shell or mounting member 124, which constitute the two relatively rigid parts adjoining the resilient means or ring 164 or 176. Such preferential direction of relative displacement extends substantially radially to the bearings or tube rotation axis 112. The embodiment of FIG. 3 is similar in this respect, in that the wall thickness of the side flanges 166C is much less than the thickness of the main body of the resilient means or ring 122, and therefore provides much less freedom substantially for relative axial movement of the adjoining parts. Furthermore, initial clamping of the side flanges 166C between the shell or mounting member 124 and the outer bearing element or race 118 eliminates part of their resilience even if such side flanges 166C are made of a porous, resiliently compressible material. However, the embodiments of FIGS. 8, 10 and 11 are preferred, because the related resilient means or rings 164, 176 and 182 can be designed to give optimum relative location of the outer bearing element or race 118 and the shell or mounting member 124 substantially in the axial direction, which is desirable in itself and also facilitates accurate assembly of the whole related bearing units.

Approximately equal freedom for relative displacement substantially in all radial directions is a desirable feature of the inventive bearing unit, if only because the angular orientation of such bearing unit at the time of mounting in the cradle or bobbin tube support mechanism is then irrelevant. However, freedom of relative movement substantially in all radial directions is not actually essential to the invention. Considering the embodiments shown in FIGS. 3, 8 and 10, the resilient means or ring 122, 164 or 176 does not rotate during use and, therefore, is compressed significantly only in one relatively limited region around its periphery. The required freedom also could be provided by a localized, resilient cushion. Essentially, the resilient means body of resiliently compressible or deformable material, whatever its form and wherever it may be located in the cradle or bobbin tube support mechanism, must be able to give or yield to a limited degree in a direction substantially parallel to the vector of reaction forces. Such reaction forces are generated at the contact zone 109 between the rotatable or friction drive roll 116 and the bobbin tube 144, as shown in FIG. 3, in response to applied or weighting forces generated by the cradle or tube support mechanism 22. The limited give or yield of the resilient means or ring in the direction substantially parallel to the vector of these reaction forces urges the bobbin tube 144 into line contact with the rotatable or friction drive roll 116 in the region of the contact zone 109.

The reaction forces referred to above will act along a line 111 connecting the predetermined roll axis 113 and the contact zone 109 between the rotatable or friction drive roll 116 and the bobbin tube 144. This contact zone 109 will vary slightly during a winding operation. This variation is partly due to a change in the geometry of the system as a package builds up on the bobbin tube 144 and the support arms 28 and 38, see FIG. 1, are pivoted back from the rotatable or friction drive roll 116. This variation is also partly due to the difference in consistency of a filament, especially a yarn or thread package as compared with the bobbin tube 144. Usually it will be particularly important to ensure line contact between the rotatable or friction drive roll 116 and the bobbin tube 144 at the start of package winding operation and through a short period thereafter during which the bobbin tube 144 is covered by only a thin layer of filament, especially yarn or thread windings. However, it is generally advantageous to ensure that resilient deformation is possible at all stages of the package winding operation.

The provision of the resilient means or ring 122, 162, 164, 176 and 182 encircling the tube rotation axis at least as far as such axis is effectively defined by the bearing axis 112 as shown in FIG. 3, serves to dampen or absorb shocks and vibrations arising at the contact zone 109 between the bobbin tube 144 or the package wound thereupon and the rotatable or friction drive roll 116. Shocks and vibrational forces may act in any direction substantially transverse to the length of the bobbin tube 144.

As described briefly hereinbefore with reference to FIGS. 1 and 2 and as is well known in the package winding art, the support arms 28 and 38 apply substantially axial forces for retaining the bobbin tube 44 in its holders. By restricting the freedom of movement of the outer bearing element or race 118 or the bearing elements 117 and 118 relative to the shell or mounting member 124 (FIG. 3) substantially in the axial direction, the substantially axial holding forces are effectively transferred to the bobbin tube 44 or 144 via the tube supports 60 and the tube receiving plates or discs 100.

In fact, it is not essential to provide any freedom of relative displacement between the bearing elements and the shell or mounting member along the bearing axis 112, provided the required freedom for substantially radial relative displacement is ensured. Thus, the illustrated side flanges 166, 166A, 166B and 166C on the resilient means or rings 122, 162, 164, 176 and 182 could be eliminated, however, the thus resulting bearing unit may prove more difficult to assemble. This might be overcome, however, by securing the resilient means or ring to the outer bearing element or race 118 prior to assembly with the shell or mounting member 124.

Even if the resilient means or ring 122 162 164 176 and 182 surrounds the bearing axis 112, as illustrated, such resilient or ring means is not necessarily made in one piece, however, assembly of sections may also prove relatively difficult. If such sections are used, circumferential gaps could be left therebetween. Such resilient means or ring could be provided, for example, by a hose structure having a flexible wall. In any event, the "single apex" 168 or 168A respectively shown in FIGS. 8 and 10 is not essential: a double apex with an intervening trough or a double arch also can be provided.

It will be noted that the resilient means or ring 122, 162, 164, 176 and 182 tends to hold the outer bearing element or race 118 or the bearing elements 117 and 118 in a predetermined standard position relative to the shell or mounting member 124 when the bearing units 102 to 102D are unloaded, and tends to return the aforementioned bearing elements 117, 118 to such predetermined disposition as the load is removed. The shell or mounting member 124 effectively forms a means limiting freedom of movement of the bearing elements 117, 118 into the restricted space 121. The resilient means or ring 122, 162, 164, 176 and 182 is provided within such restricted space 121 in order to hold the bearing elements 117, 118 in the aforementioned predetermined disposition relative to the shell or mounting member 124. Freedom of movement is much more closely restricted substantially in the axial direction than substantially in the radial direction.

It will also be noted that in view of the permitted freedom of movement, pivoted movement of the shell or mounting member 124 within its receiving socket 114A is unnecessary. The socket 114A can be arranged to firmly grip the shell or mounting member 124, while permitting its removal and replacement by a snap-fit action.

The invention, of course, is not limited to the provision of the resilient means or ring 122, 162, 164, 176 and 182 between the bearing elements 117, 118 and the shell or mounting member 124. Clearly, similar effects could be achieved by providing the resilient means or ring between a sleeve and the inner bearing element or race 117 of the bearing, in which case the sleeve preferably has outwardly projecting flanges cooperating with the inner bearing element or race 117 in order to restrict movement thereof.

When the resilient means or body 130, 134, 136, 140, 142 and 144 is provided at a different location in the cradle or bobbin tube support mechanism 22, e.g. as indicated the sketches in FIGS. 5A to 5F, the relatively rigid parts adjoining such resilient means or body may be formed so as to more strongly restrict freedom of relative movement substantially in the axial direction than substantially in the radial direction, and/or such resilient means or body itself may be provided with a directional preferential resilient compressibility or deformability.

The substantially axial movement permitted for the bearing elements 117 and 118 in the exemplary embodiments of the inventive bearing unit 102 to 102D shown in FIGS. 3, 8, 10 and 11 can be made very small, i.e. 0.2 to 0.3 mm or less. Each bearing unit 102 to 102D can be constructed and arranged to provide more than 1.5 mm substantially radial movement, although advantages can still be achieved with lesser radial freedom, e.g. 0.5 mm and above.

The resiliently compressible material selected for the resilient means or rings 162, 176 and 182 shown in FIGS. 8, 10 and 11 may have a Shore hardness in the range 25±5%. A lower hardness results in advantages with respect to compressibility or deformability, however very soft rubbery types of materials with a Shore hardness in the range of 15 to 20 are difficult to process and subject to aging; such materials, therefore, are not readily commercially available. However, it is not necessary to use the very soft rubbery materials because the geometry of the resilient means or ring 164, 176 and 182 can be adapted, as shown by the illustrated embodiments, such as to give the desired performance.

While there are shown and described present preferred embodiments of the invention, it is to be distinctly understood that the invention is not limited thereto but may be otherwise variously embodied and practiced within the scope of the following claims. Accordingly,

What we claim is:

1. A yarn take-up system for winding a filament, especially a yarn or thread into a package on a bobbin tube, comprising:

a rotatable roll rotatable about a predetermined roll axis;

a bobbin tube support mechanism supporting the bobbin tube and the package wound thereupon and urging said bobbin tube or package wound thereupon into engagement with said rotatable roll in a predetermined contact zone of said rotatable roll;

said bobbin tube support mechanism containing means defining a tube rotation axis for said bobbin tube supported by said bobbin tube support mechanism;

said tube rotation axis of said bobbin tube supported by said bobbin tube support mechanism, extending approximately parallel to said predetermined roll axis;

said bobbin tube support mechanism further containing resilient means and a predetermined number of relatively rigid parts adjoining said resilient means;

said resilient means permitting relative displacement of said relatively rigid parts adjoining said resilient means; and said relatively rigid parts and said resilient means being constructed and arranged such that said resilient means possesses at least one inherently preferred direction of deformability such as to permit a greater extent of relative displacement of said relatively rigid parts in directions directed substantially parallel to a connecting line connecting said predetermined roll axis and said contact zone of said roll than in directions substantially parallel to said approximately parallel predetermined roll axis and tube rotation axis.

2. The yarn take-up system as defined in claim 1, wherein:

said relatively rigid parts and said resilient means of said bobbin tube support mechanism interact with one another to affect deformation of the resilient means such as to permit a greater extent of relative displacement in all directions directed substantially radial to said tube rotation axis than in directions directed substantially parallel to said tube rotation axis.

3. The yarn take-up system as defined in claim 2, wherein:

said resilient means comprise a resilient ring encircling said tube rotation axis.

4. The yarn take-up system as defined in claim 3, wherein:

said means defining said tube rotation axis comprises a bearing defining one of the relatively rigid parts; and said resilient ring encircling said bearing.

5. The yarn take-up system as defined in claim 1, wherein:

said bobbin tube support mechanism containing at least one support arm;

said at least one support arm being provided with snap-fit connection means for connection between said at least one support arm and said means defining said tube rotation axis.

6. The yarn take-up system as defined in claim 5, wherein:

said snap-fit connection means comprises a socket mounted at said at least one support arm;

said means defining said tube rotation axis containing a mounting portion; and said socket receiving said mounting portion of said means defining said tube rotation axis.

7. The yarn take-up system as defined in claim 5, wherein:

said snap-fit connection means contains a connector pin mounted at said at least one support arm;

said means defining said tube rotation axis containing a mounting portion; and said mounting portion fitting on said connector pin of said snap-fit connection means.

8. The yarn take-up system as defined in claim 1, wherein:

said predetermined number or relatively rigid parts adjoining said resilient means of said bobbin tube support mechanism, constitute two relatively rigid parts;

said resilient means being constructed such as to hold a first one of said two relatively rigid parts in a predetermined disposition relative to a second one of said two relatively rigid parts; and said second relatively rigid part defining a restricted space within which said first relatively rigid part is movable away from said predetermined disposition against a bias applied by said resilient means in said at least one inherently preferred direction of deformability.

9. The yarn take-up system as defined in claim 8, wherein:

said second relatively rigid part defines said restricted space such that said restricted space is more closely restricted in directions directed substantially parallel to said tube rotation axis than in directions directed substantially parallel to said connecting line connecting said predetermined roll axis and said contact zone of said rotatable roll in order to impart to said resilient means said at least one inherently preferred direction of deformability extending substantially parallel to said connecting line.

10. The yarn take-up system as defined in claim 8, wherein:

said resilient means is deformable in preselected directions;

said resilient means being relatively easily deformable in said preselected directions extending substantially parallel to said connecting line and defining said at least one inherently preferred direction of deformability; and said resilient means being relatively resistant against deformation in directions extending substantially parallel to said tube rotation axis.

11. In a bobbin tube support mechanism for a take-up system for winding a filament, especially a yarn or thread into a package on a bobbin tube and in which take-up system the bobbin tube or package forming thereupon engages a rotatable roll, the combination of:

means for supporting a bobbin tube;

a rotatable roll with which engages the bobbin tube or package forming thereon;

said means for supporting a bobbin tube comprising a resiliently compressible body and means for housing said resiliently compressible body such as to influence the compression thereof in a predeterminate manner;

means for producing a force for compressing said resiliently compressible body; and said resiliently compressible body being resiliently compressible under the action of said force-producing means and in coacting with said housing means in order to impart to said resiliently compressible body at least one inherently preferred direction of compression such that the bobbin tube or the package forming thereupon are in line contact with at least a plurality of spaced regions of the rotatable roll.

12. In a bobbin tube support mechanism for a take-up system in which a filament, especially a yarn or thread is wound up into a package on a bobbin tube and the bobbin tube or the package wound thereupon engages an associated region of a drive roll, the combination of:

at least one support arm for supporting the bobbin tube or the package wound thereupon;

a rotatable drive roll which engages the bobbin tube or package wound thereupon;

mounting means rotatably mounting the bobbin tube at said at least one support arm for rotation about an axis of rotation;

said mounting means comprising resilient means and means for enclosing said resilient means such as to influence deformability thereof in a predetermined manner;

said resilient means possessing a predetermined resiliency;

said enclosing means coacting with said resilient means to impart thereto at least one inherently preferred direction of deformability which extends substantially radially with respect to the axis of rotation of the bobbin tube;

means for producing a force for deforming said resilient means;

said resilient means permitting adjustment of said bobbin tube, which is rotatably mounted at said at least one support arm, relative to said drive roll within the limits of said predetermined resiliency of said resilient means deformable under the action of said force-producing means in order to thereby maintain proper driving alignment of the bobbin tube or the package wound thereupon with the associated region of said drive roll.

13. The combination as defined in claim 12, wherein:

said means for enclosing said resilient means comprise two relatively rigid parts;

said two relatively rigid parts adjoining said resilient means on opposite sides thereof;

said drive roll defining a predetermined roll axis; and said resilient means permitting said adjustment by displacement of said relatively rigid parts relative to each other at least in a direction substantially transverse to said predetermined roll axis and governed by said at least one inherently preferred direction of deformability of the resilient means.

14. The combination as defined in claim 13, further including:

support means supporting said at least one support arm;

said at least one support arm being subdivided into at least two support arm sections;

said resilient means being interposed between said at least two support arm sections; and said at least two support arm sections constituting said two relatively rigid parts adjoining said resilient means on opposite sides thereof.

15. The combination as defined in claim 13, further including:

support means supporting said at least one support arm;

a bearing member and a pivot pin associated with said support means and conjointly constituting a pivot bearing for pivotably mounting said support means;

said resilient means constituting a resilient sleeve having an inner wall and an outer wall; and said bearing member and said pivot pin constituting said two relatively rigid parts adjoining said resilient sleeve on said opposite sides thereof which are formed by the inner wall and the outer wall of said resilient sleeve.

16. The combination as defined in claim 15, wherein: said pivot pin is connected with said support means.

17. The combination as defined in claim 15, wherein:

said bearing member is formed by the wall of a bore in said support means.

18. The combination as defined in claim 13, further including:

support means supporting said at least one support arm;

said support means being subdivided into at least two support sections;

said resilient means being interposed between said at least two support sections of said support means; and said at least two support sections constituting said two relatively rigid parts adjoining said resilient means on opposite sides thereof.

19. The combination as defined in claim 13, further including:

support means supporting said at least one support arm;

said resilient means interconnecting said support means and said at least one support arm; and said support means and said at least one support arm constituting said two relatively rigid parts adjoining said resilient means at said opposite sides thereof.

20. The combination as defined in claim 13, wherein:

said at least one support arm carries a tube support for the bobbin tube;

said tube support being part of said mounting means; and said resilient means cooperating with said tube support.

21. The combination as defined in claim 20, wherein:

said tube support contains a support member mounted at said at least one support arm;

said resilient means being interposed between said support member and said at least one support arm; and said support member and said at least one support arm constituting said two relatively rigid parts adjoining said resilient means at said opposite sides thereof.

22. The combination as defined in claim 20, wherein:

said tube support contains a bearing unit rotatably supporting the bobbin tube;

said tube support containing a mounting portion for mounting said bearing unit;

said resilient means being interposed between said bearing unit and said mounting portion of said tube support; and said bearing unit and said mounting portion of said tube support constituting said two relatively rigid parts adjoining said resilient means on said opposite sides thereof.

23. The combination as defined in claim 20, wherein:

said tube support contains a bearing unit rotatably supporting said bobbin tube at said tube support;

said bearing unit defining said enclosing means for said resilient means;

said bearing unit comprises a mounting member for mounting said bearing unit and said tube support;

said mounting member constitutes a shell;

said bearing unit further comprising a predetermined number of bearing elements rotatable relative to each other about a bearing rotational axis which defines a tube rotation axis;

said resilient means being interposed between said shell and said predetermined number of bearing elements; and said shell and said predetermined number of bearing elements constituting said two relatively rigid parts adjoining said resilient means on said opposite sides.

24. The combination as defined in claim 23, wherein:

said shell at least circumferentially extending around said predetermined number of bearing elements in a spaced relationship defining a space therebetween;

said resilient means being located at least at predetermined circumferential locations between said shell and said predetermined number of bearing elements; and said resilient means permitting said adjustment of said bobbin tube relative to said drive roll and in order to thereby maintain said proper driving alignment between said bobbin tube rotation axis with said associated region of said drive roll, by permitting displacement of said predetermined number of bearing elements and said shell relative to each other.

25. The combination as defined in claim 24, wherein:
said shell constitutes a circumferential shell;
said predetermined number of bearing elements comprising at least one preselected bearing element;
said resilient means being located at least at said predetermined circumferential locations between said circumferential shell and said at least one preselected bearing element; and
said resilient means permitting as said displacement, a displacement of said predetermined number of bearing elements relative to said circumferential shell substantially in radial direction with respect to said bearing rotational axis.

26. The combination as defined in claim 24, wherein:
said shell contains at least one side flange;
said redetermined number of bearing elements comprising at least one preselected bearing element;
said at least one preselected bearing element possessing two end faces;
said at least one side flange of said shell extending in a spaced relationship to one of said two end faces of said at least one preselected bearing element;
said resilient means being located at least at said predetermined circumferential locations between said shell and said at least one preselected bearing element and between said at least one side flange of said shell and said one end face of said at least one preselected bearing element;
said resilient means permitting as said displacement, a displacement of said predetermined number of bearing elements and said shell relative to each other substantially in radial direction with respect to said bearing rotational axis; and
said resilient means permitting a further displacement of said predetermined number of bearing elements and said at least one side flange of said shell relative to each other substantially in a direction parallel to said bearing rotational axis.

27. The combination as defined in claim 25, wherein:
said resilient means constitute a body of resiliently deformable material possessing a predetermined deformability; and
said body of resiliently deformable material permitting said displacement within the limits of said predetermined deformability of said body of said resiliently deformable material.

28. The combination as defined in claim 27, wherein:
said body of resiliently deformable material constitutes a porous body of resiliently compressible material possessing a predetermined compressibility;
said porous body of resiliently compressible material, at least at said predetermined circumferential locations, substantially filling the space between said circumferential shell and said at least one preselected bearing element; and
said porous body of resiliently compressible material permitting said displacement of said predetermined number of bearing elements and said circumferential shell relative to each other in said substantially radial direction with respect to said bearing rotational axis within the limits of said predetermined compressibility which defines said predetermined deformability.

29. The combination as defined in claim 27 wherein:
said body of resiliently deformable material constitutes a compact body of elastomer;
said compact body of elastomer defining at least one free space between said compact body of elastomer and a desired one of said circumferential shell or said at least one preselected bearing element; and
said compact body of elastomer permitting said displacement within the limits of said predetermined deformability of said compact body of elastomer into said at least one free space defined between said compact body of elastomer and a desired one of said circumferential shell and said at least one preselected bearing element.

30. The combination as defined in claim 26, wherein:
said body of resiliently deformable material constitutes a porous body of resiliently compressible material possessing a predetermined compressibility;
least at said predetermined circumferential material at least at siad predetermined circumferential locations, substantially filling the space between said shell and said at least one preselected bearing element;
said porous body of resiliently compressible material further substantially filling the space between said at least one side flange of said shell and said one end face of said at least one preselected bearing element;
said porous body of resiliently compressible material permitting said displacement within the limits of said predetermined compressibility which defines said predetermined deformability; and
said porous body of resiliently compressible material permitting as said further displacement, a restricted displacement of said predetermined number of bearing elements and said at least one side flange of said shell relative to each other in said substantially parallel direction with respect to said bearing rotational axis within the limits of said predetermined compressibility which defines said predetermined deformability.

31. The combination as defined in claim 30, wherein:
said body of resiliently deformable material constitutes a porous body of resiliently compressible material possessing a predetermined compressibility;
said porous body of resiliently compressible material, at least at said predetermined circumferential locations, substantially filling the space between said shell and said at least one preselected bearing element;
said porous body of resiliently compressible material further substantially filling the space between said at least one side flange of said shell and said one end face of said at least one preselected bearing element;

said porous body of resiliently compressible material permitting said displacement within the limits of said predetermined compressibility which defines said predetermined deformability; and said porous body of resiliently compressibility material permitting as said further displacement, a restricted diplacement of said predetermined number of bearing elements and said at least one side flange of said shell relative to each other in said substantially parallel direction with respect to said bearing rotational axis within the limits of said predetermined compressibility which defines said predetermined deformability.

32. The combination as defined in claim 26, wherein:

said body of resiliently deformable material constitutes a compact body of elastomer possessing a prdetermined deformability;

said compact body of elastomer at least at said predetermined circumferential locations defining at least one free space between said compact body of elastomer and a desired one of said shell and said at least one preselected bearing element;

said compact body of elastomer defining at least one further free space between said compact body of elastomer and a desired one of said side flange of said shell and said end face of said at least one preselected bearing element;

said compact body of elastomer permitting said displacement within the limits of said predetermined deformability of said compact body of elastomer into said at least one said free space defined between said compact body of elastomer and said desired one of said shell and said at least one preselected bearing element; and said compact body of elastomer permitting as said further displacement, a restricted displacement of said predetermined number of bearing elements and said at least one side flange of said shell relative to each other in said substantially parallel direction to said bearing rotational axis within the limits of said predetermined deformability of said compact body of elastomer into said at least one further free space defined between said compact body of elastomer and said desired one of said at least one side flange of said shell and said one end face of said at least one preselected bearing element.

33. The combination as defined in claim 24, wherein:

said shell contains at least one side flange;

said predetermined number of bearing elements comprising at least one preselected bearing element;

said at least one preselected bearing element possesses two end faces;

said at least one side flange extending in a spaced relationship to one of said two end faces of said at least one preselected bearing element;

said resilient means constituting a compact body of elastomer possessing a predetermined deformability;

said compact body of elastomer being located at least at predetermined circumferential locations between said shell and said at least one preselected bearing element;

said compact body of elastomer further being located between said at least one side flange of said shell and said one end face of said at least one preselected bearing element;

said compact body of elastomer at least at said predetermined circumferential locations, defining at least one free space between said compact body of elastomer and a desired one of said shell and said at least one preselected bearing element;

said compact body of elastomer substantially filling the space between said at least one side flange of said shell and said one end face of said at least one preselected bearing element; and said compact body of elastomer permitting as said displacement, a displacement of said predetermined number of bearing elements and said shell relative to each other substantially in radial direction with respect to said bearing rotational axis within the limits of said predetermined deformability which defines said predetermined resiliency of said compact body of elastomer into said at least one free space defined between said compact body of elastomer and said desired one of said shell and said at least one preselected bearing element.

34. The combination as defined in claim 13, further comprising:

support means supporting at least one support arm;

said at least one support arm constituting two support arms; and said support means constitutes a yoke from which said two support arms extend substantially parallel to each other.

35. The combination as defined in claim 34, wherein:

each one of said two support arms is provided with said resilient means; and each one of said two support arms containing said two relatively rigid parts adjoining said resilient means.

* * * * *

UNITED STATES PATENT AND TRADEMARK OFFICE
CERTIFICATE OF CORRECTION

PATENT NO. : 4,848,686

DATED : July 18, 1989

INVENTOR(S) : ROBERT DEMUTH et al

It is certified that error appears in the above-identified patent and that said Letters Patent is hereby corrected as shown below:

Column 10, line 21, please delete "take-pp" and insert --take-up--

Column 25, line 31, please delete "redetermined" and insert --predetermined--

Column 26, line 31, please delete "least at said predetermined circumferential material" and insert --said porous body of resiliently compressible material,--

Column 26, line 32, after "at" please delete "siad" and insert --said--

Column 27, line 5, please delete "compressibility" and insert --compressible--

Column 27, line 7, please delete "diplacement" and insert --displacement--

Signed and Sealed this

Twelfth Day of June, 1990

Attest:

HARRY F. MANBECK, JR.

*Attesting Officer*  *Commissioner of Patents and Trademarks*